United States Patent [19]
Hool

[11] Patent Number: 5,944,068
[45] Date of Patent: Aug. 31, 1999

[54] APPARATUS AND METHOD FOR PREFILLING SECONDARY HYDRAULIC CIRCUITS OF A VEHICULAR BRAKING SYSTEM

[75] Inventor: Patrick Henry Hool, St. Clair, Mich.

[73] Assignee: Kelsey-Hayes Company, Livonia, Mich.

[21] Appl. No.: 08/799,283

[22] Filed: Feb. 13, 1997

[51] Int. Cl.⁶ ........................................... B65B 1/04
[52] U.S. Cl. ........................ 141/65; 188/352; 141/98
[58] Field of Search ............................ 141/65, 59, 1, 141/2, 4, 5, 7, 18, 21, 98; 188/352

[56] References Cited

U.S. PATENT DOCUMENTS

| | | | |
|---|---|---|---|
| 4,418,803 | 12/1983 | Chichester | 188/352 |
| 4,785,629 | 11/1988 | Ennis, III et al. | 188/352 |
| 5,324,101 | 6/1994 | Kehl et al. | |
| 5,505,529 | 4/1996 | Siegel et al. | |
| 5,555,919 | 9/1996 | Lipp | 141/59 |
| 5,605,384 | 2/1997 | Johnston et al. | 188/352 |
| 5,641,003 | 6/1997 | Rey et al. | 141/1 |

Primary Examiner—Steven O. Douglas
Attorney, Agent, or Firm—MacMillan, Sobanski & Todd, LLC; A. Michael Tucker

[57] ABSTRACT

An access port to a secondary circuit of a hydraulic braking system of a vehicle is provided in a hydraulic control unit. A prefilling apparatus for adding brake fluid to the secondary circuit includes a first device for evacuating and filling the secondary circuit with brake fluid. The first device includes a switchable valve connected to the access port, a pump, and a pressurized fluid reservoir. The prefilling apparatus also includes a second device for expelling trapped air from a pump of the hydraulic braking system. The second device includes a piston/cylinder arrangement connected to the access port, a source of pressurized air, and a fluid reservoir connected to the piston/cylinder arrangement. A connection tool and method for prefilling the secondary circuit utilizing this prefilling apparatus are also disclosed.

14 Claims, 3 Drawing Sheets

APPARATUS AND METHOD FOR PREFILLING SECONDARY HYDRAULIC CIRCUITS OF A VEHICULAR BRAKING SYSTEM

BACKGROUND OF THE INVENTION

This invention relates in general to hydraulic braking systems for vehicles, and in particular to an apparatus and method for prefilling secondary circuits of a hydraulic control unit of an anti-lock brake system ("ABS").

Anti-lock braking systems for vehicles are well known hydraulic systems. Hydraulic fluid is carried by brake lines or circuits between a master cylinder and wheel brake assemblies. A hydraulic control unit or housing, containing valves and other components such as a pump, is located between the master cylinder and the wheel brake assemblies. Through a controller, the valves and other components selectively control pressure to the wheel brake assemblies to provide a desired braking response of the vehicle.

In one type of ABS, a normally open solenoid valve functions as an isolation or inlet valve in a main brake line between a master cylinder and a wheel brake assembly. A normally closed solenoid valve in the main brake line functions as a dump or outlet valve between the wheel brake assembly and an accumulator or expander which can receive fluid from the wheel brake assembly when the dump valve is opened. A pump is provided to pull fluid from the expander back to the master cylinder and the braking circuit. The portion of an ABS between the normally closed outlet valve and the pump is known as a secondary circuit. The balance of the hydraulic circuit of the ABS is known as the primary circuit.

During assembly of a vehicle, hydraulic brake fluid is added to the ABS. In most instances, the electrical connections between the ABS and its power source have not been made at the time when brake fluid is added. When brake fluid is introduced to the ABS, usually through a reservoir at the master cylinder, the volume of the secondary circuit does not receive fluid since the normally closed solenoid valve and pump block fluid from entering this section. Electrical power must be connected to the ABS later in the assembly process and the outlet valves actuated in order to actuate the normally closed solenoid valve and pump to fill the secondary circuit with brake fluid.

In a known ABS, lip seals are incorporated into the normally closed dump valves. During the evacuation process, the vacuum connected to the primary circuit pulls air past the lip seals to suck air from the secondary circuits. The lip seals acts as one-way check valves to permit air to pass from the secondary circuits while blocking brake fluid into the secondary circuits. During a dynamic vehicle test at the end of the assembly line, the secondary circuits are filled with brake fluid when the dump valves are opened.

In another known ABS, a vehicle assembly plant must manipulate ABS components in order to evacuate and fill the secondary circuits. Internal bleed screws are provided for each circuit and shipped to the assembly plant one-half turn from a seated position. Plungers for fluid accumulators must be pushed into a bypass position. Following the evacuation and fill process, the bleed screws must be tightened to seated positions and plunger tools must be removed.

SUMMARY OF THE INVENTION

The present invention provides an ABS in which hydraulic brake fluid can be added to the secondary circuit and any trapped air in the pump can be removed during assembly of a vehicle. The present invention permits evacuation and filling of secondary circuits without cycling solenoid valves or manipulating fluid flow components during assembly of a vehicle. The present invention does not require electrical connection and operation of the braking system when brake fluid is added to a system during assembly of a vehicle.

The present invention can expel trapped air between the inlet and outlet valves of the pump. During the assembly process, it is possible to trap a volume of air between the inlet and outlet valves of the pump which can prevent the pump from operating properly. Because air has a relatively high compressibility compared to brake fluid, such a trapped volume may not allow the pump to generate a sufficient vacuum level during suction phase to open the inlet valve. The present invention removes trapped air in the pump and fills the volume with brake fluid.

This invention relates to an apparatus and method for adding hydraulic brake fluid to vehicular braking systems, including anti-lock braking systems. The apparatus and method utilize an access port provided in a hydraulic control unit of the braking system to remove trapped air and add hydraulic fluid to a secondary circuit. This operation is known as an evacuation and filling process.

In a preferred embodiment, an access port to a secondary circuit of a hydraulic braking system is provided in a hydraulic control unit. A prefilling apparatus according to this invention includes a first device for evacuating and filling a secondary circuit with brake fluid. The first device includes a switchable valve connected to an access port of the hydraulic braking system, a pump, and a pressurized fluid reservoir. The prefilling apparatus also includes a second device for expelling trapped air from a pump of the hydraulic braking system. The second device includes a piston/cylinder arrangement connected to the access port and a source of pressurized air. A fluid reservoir is also connected to the piston/cylinder arrangement. A connection tool and method for prefilling the secondary circuit utilizing this prefilling apparatus are also disclosed.

Various objects and advantages of this invention will become apparent to those skilled in the art from the following detailed description of the preferred embodiment, when read in light of the accompanying drawings.

DETAILED DESCRIPTION OF THE INVENTION

Figure 1:
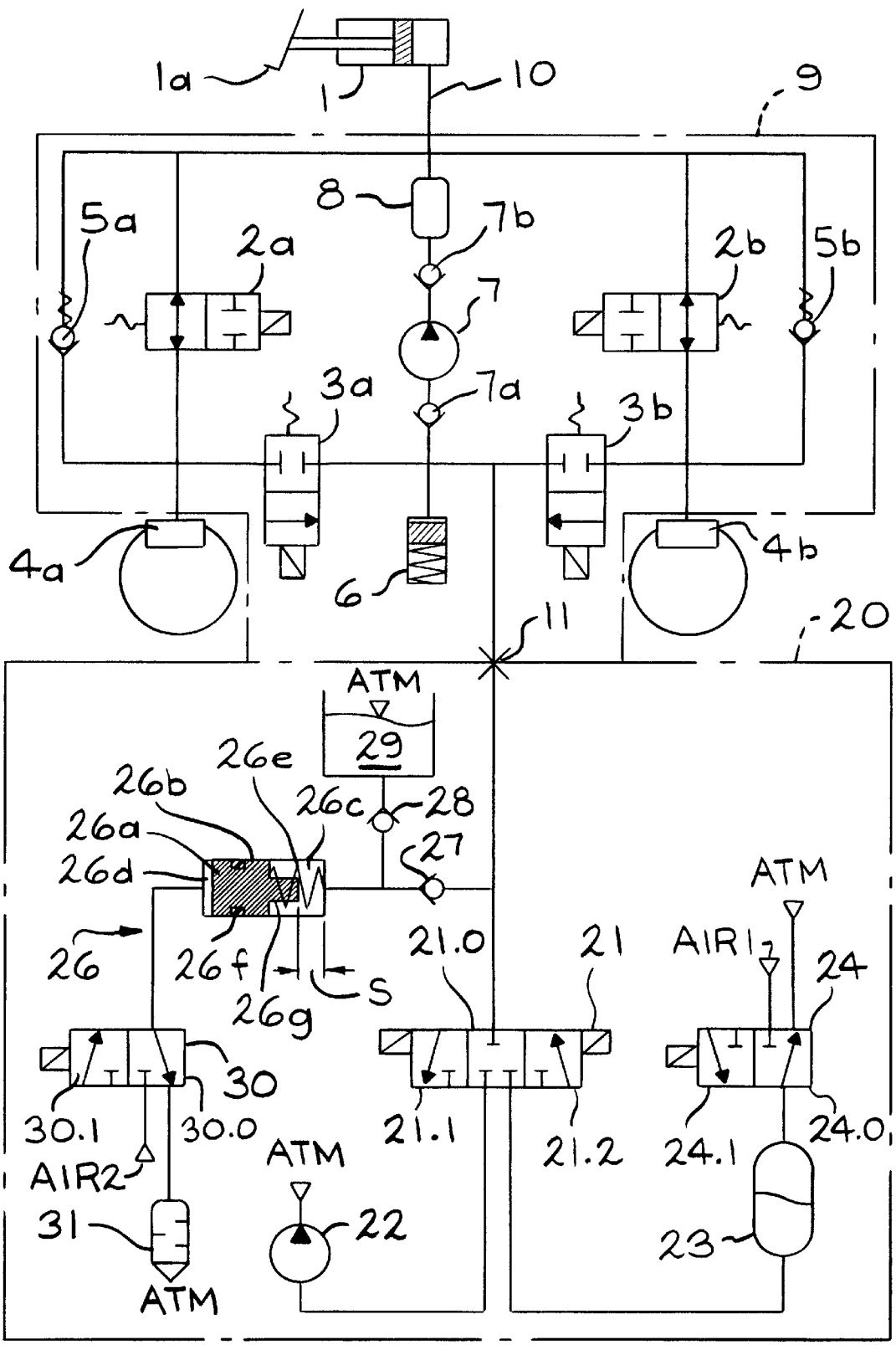
FIG. 1 is a schematic illustration of an anti-lock braking system for two of four wheels of a motor vehicle and a schematic illustration of a prefill apparatus in accordance with this invention.

A brake circuit for two of four wheels of an anti-lock braking system of the type for motor vehicles is schematically illustrated in the upper half of FIG. 1. A similar circuit (not illustrated) can be utilized for the remaining two wheels of the vehicle. A brake pedal 1a serves to activate a brake-pressure generation unit 1, e.g., a master cylinder, for supplying a brake circuit 10 with pressurized brake fluid.

The brake circuit 10 connects the brake-pressure generation unit 1 with wheel brakes 4a, 4b of a motor vehicle.

First solenoid valves 2a, 2b (isolation or inlet valves) and second solenoid valves 3a, 3b (dump or outlet valves) are arranged in the brake circuit 10 between the brake-pressure generation unit 1 and the wheel brakes 4a, 4b. Each of the solenoid valves 2a, 2b, 3a, 3b is driven by an electronic control unit (not shown) in order to modulate the pressure in the wheel brakes 4a, 4b. For this purpose the electronic control unit (not shown) determines the rotational behavior of the vehicle wheels associated with the wheel brakes 4a, 4b in order to set pressure increasing (applying), pressure decreasing (dumping or releasing) and pressure hold phases by controlling the solenoid valves 2a, 2b, 3a, 3b.

In the electrically non-activated condition the first solenoid valve 2a, 2b assumes its normally opened position and the second solenoid valve 3a, 3b assumes its normally closed position in order to be able to increase pressure in the wheel brakes 4a, 4b. When only the first solenoid valve 2a, 2b is activated, the first solenoid valve 2a, 2b assumes its closed position and the second solenoid valve 3a, 3b will remain in its closed position so that the pressure in the wheel brake 4a, 4b is maintained constant. If both the first solenoid valve 2a, 2b and the second solenoid valve 3a, 3b, are activated, the first solenoid valve 2a, 2b will assume its closed position and the second solenoid valve 3a, 3b will assume its opened position in order to decrease pressure in the wheel brake 4a, 4b. In the embodiment illustrated in FIG. 1, brake fluid can flow from the wheel brake 4a, 4b into an expander or accumulator 6. The brake fluid in the expander 6 is returned to the brake circuit 10 by means of a pump 7. Usually the pump 7 is driven by an electric motor (not shown) which is also controlled by the electronic control unit (not shown).

The valve arrangements 2a, 3a and 2b, 3b can also be formed by mechanical mass flow control valves instead of the first solenoid valve 2a, 2b, or by a 2 position/3-way solenoid valve instead of both the first solenoid valve 2a, 2b and the second solenoid valve 3a, 3b. Other known valves including 3 position valves and proportional valves, used individually or in combination, can be used in the braking circuit 10 to control brake fluid pressure at the wheel brakes 4a, 4b. For purposes of this disclosure, all such embodiments of valves 2a, 3a and 2b, 3b are described as pressure control valves. Secondary circuits in such braking circuits include a normally closed pressure control valve.

A check valve 5a, 5b is arranged in parallel to the first solenoid valve 2a, 2b for establishing a direct connection of the wheel brake 4a, 4b with the brake-pressure generation unit 1, in case the pressure in the wheel brake 4a, 4b exceeds a critical maximum pressure.

An attenuator chamber 8 is arranged between the outlet side of the pump 7 and the brake-pressure generation unit 1 for compensating pulsations which occur during operation of the pump 7.

As is typical in the case of anti-lock brake systems, the pump 7 operates as a piston pump which alternately executes working strokes for sucking brake fluid via an inlet valve 7a into a working chamber and pressing brake fluid from the working chamber via an outlet valve 7b. Normally the inlet and outlet valves 7a, 7b are integrated within the pump 7.

Preferably, the solenoid valves 2a, 2b, 3a, 3b, the check valves 5a, 5b, expander 6, pump 7, and attenuator chamber 8 are housed in a hydraulic control unit (HCU) 9, also known as a hydraulic unit. The HCU 9 is preferably formed as a housing from a lightweight material such as aluminum or an aluminum alloy. The HCU 9 includes bores for receiving the various components and passageways for permitting fluid flow between the components as indicated. In other embodiments, the HCU 9 may include additional components. In yet other embodiment, the HCU 9 may not include all of the components illustrated in FIG. 1.

For purposes of this application, a secondary circuit of the brake circuit 10 includes the portion of the anti-lock brake circuit between the solenoid valves 3a, 3b and the pump 7. Furthermore, the secondary circuit includes an access port 11 provided in the HCU 9. The access port 11 is formed as an opening in the housing and is in fluid communication with the secondary circuit. In the embodiment illustrated in FIG. 1, the secondary circuit also includes the expander 6. In other embodiments, the secondary circuit may not include an expander and may include additional components. A primary circuit of the brake circuit 10 is the remainder of the anti-lock brake circuit (excluding the secondary circuit).

A prefill apparatus 20 in accordance with a preferred embodiment of this invention is schematically illustrated in the lower half of FIG. 1. The prefill apparatus 20 is connected via the access port 11 to the secondary circuit of the brake circuit. Without activating the solenoid valves 3a, 3b and/or the pump 7, the volume of the secondary circuit is cut off from hydraulic fluid during a conventional filling process through the brake-pressure generation unit 1. The prefill apparatus 20 provides the secondary circuit with brake fluid without activating the solenoid valves 3a, 3b and/or the pump 7. This procedure is known as prefilling the secondary circuit.

The prefill apparatus 20 preferably includes a housing mounting a first device for evacuating and filling the secondary circuit with brake fluid. The first device includes a 3 position/3-way (or 3 position/3-port) solenoid valve 21 connected to the access port 11 on a first side of the valve 21. A vacuum pump 22 and a pressurized reservoir 23 containing brake fluid are connected to a second side of the valve 21. In the electrically non-activated condition, the 3 position/3-way solenoid valve 21 assumes its neutral position 21.0 in order to separate the access port 11 from the vacuum pump 22 and the pressurized reservoir 23, thereby precluding fluid flow. In a first electrically activated condition, the 3 position/3-way solenoid valve 21 assumes its first activated position 21.1 in order to connect the access port 11 with the vacuum pump 22 and to separate the pressurized reservoir 23 from the access port 11. In a second electrically activated condition the 3 position/3-way solenoid valve 21 assumes its second activated position 21.2 in order to connect the pressurized reservoir 23 with the access port 11 and to separate the vacuum pump 22 from the access port 11.

The pressurized reservoir 23 is supplied with pressurized air. To control the pressurized air, a 2 position/3-way solenoid valve 24 is connected with a first air inlet AIR1, an atmosphere inlet ATM and the pressurized reservoir 23. In the electrically non-activated condition, the 2 position/3-way solenoid valve 24 assumes its basic position 24.0 in order to connect the pressurized reservoir 23 with the atmosphere inlet ATM and to separate the first air inlet AIR1. In the electrically activated condition, the 2 position/3-way solenoid valve 24 assumes its activated position 24.1 in order to connect the first air inlet AIR with the pressurized reservoir 23 and to separate the atmosphere inlet ATM.

When the 3 position/3-way solenoid valve 21 is switched from its neutral position 21.0 to its first activated position 21.1, the access port 11 is connected with a vacuum pump 22 for evacuating air from the secondary circuit through the access port 11. Next the 3 position/3-way solenoid valve 21 is switched to its second activated position 21.2 so that the pressurized reservoir 23 is connected with the access port 11 for filling the secondary circuit with brake fluid from the pressurized reservoir 23 through the access port 11. As soon as the secondary circuit including the expander 6 is completely filled with brake fluid, the 3 position/3-way solenoid valve 21 is switched back to its neutral position 21.0.

The air pressure which is supplied to the pressurized reservoir 23 during filling of the secondary circuit is controlled in such a manner that the fill pressure is sufficiently great to completely fill the expander chamber 6 with brake fluid, but less than the sum of the cracking pressures of the inlet and outlet valves 7a, 7b of the pump 7. This prevents brake fluid from pushing via the inlet and outlet valves 7a, 7b of the pump 7 into the primary circuit of the brake system. The control of the air pressure can be done by means of the 2 position/3-way solenoid valve 24 or by means of a separate regulator (not shown).

The prefill apparatus 20 also includes a second device for expelling any trapped air inside the pump 7. More precisely, the second device expels trapped air between the inlet and outlet valves 7a, 7b of the pump 7. The second device includes a piston/cylinder arrangement 26 which consists of a piston 26a guided in a cylinder 26b which forms a hydraulic chamber 26c and a pneumatic chamber 26d. For separating the hydraulic chamber 26c from the pneumatic chamber 26d, a sealing element 26f is provided between the piston 26a and the cylinder 26b. The hydraulic chamber 26c is connected with the access port 11 via a first check valve 27 and with a reservoir 29 containing brake fluid via a second check valve 28. The first check valve 27 is orientated in such a manner that brake fluid can only flow in the direction from the pressure chamber 26c to the access port 11, while the second check valve 28 is orientated in such a manner that brake fluid can only flow in the direction from the reservoir 29 to the pressure chamber 26c.

For actuation of the piston 26b, the pneumatic chamber 26d is supplied with air pressure. To control the air pressure, a second 2 position/3-way solenoid valve 30 is connected with a second air inlet AIR2, atmosphere ATM via an exhaust muffler 31, and the pneumatic chamber 26d of the piston/cylinder arrangement 26. In the electrically non-activated condition, the second 2 position/3-way solenoid valve 30 assumes its basic position 30.0 in order to connect the pneumatic chamber 26d of the piston/cylinder arrangement 26 with atmosphere ATM via the exhaust muffler 31 and to separate the second air inlet AIR2. In the electrically activated condition, the second 2 position/3-way solenoid valve 30 assumes its activated position 30.1 in order to connect the second air inlet AIR2 with the pneumatic chamber 26d of the piston/cylinder arrangement 26 and to separate the connection with atmosphere ATM via the exhaust muffler 31. When the second 2 position/3-way solenoid valve 30 remains in its basic position 30.0, the pneumatic chamber 26d is not supplied with air pressure so that under the effect of a spring means 26e the piston 26a assumes its rest position as shown in FIG. 1 and the hydraulic chamber 26c is filled via the second check valve 27 with brake fluid from the reservoir 29. When the second 2 position/3-way solenoid valve 30 is switched to its activated position 30.1, the pneumatic chamber 26d is supplied with air pressure from the second air inlet AIR2, so that the piston 26a is actuated against the force of the spring means 26e in order to push the brake fluid in the hydraulic chamber 26c via the first check valve 27 and the access port 11 into the secondary circuit of the brake circuit.

Because of a forwardly-projecting abutment 26g, the stroke of the piston 26a is defined as a travel distances, so that the volume of brake fluid which is pushed into the secondary circuit as described before is equal to or slightly greater than the trapped volume of air inside the pump 7. Thus, the trapped volume of air inside the pump 7 is expelled by the measured amount of brake fluid.

When the second 2 position/3-way solenoid valve 30 is switched back to its basic position 30.0 so that the pneumatic chamber 26d of the piston/cylinder arrangement 26 is vented, the piston 26a returns under effect of the spring means 26e to its rest position as shown in FIG. 1 for filling the hydraulic chamber 26c of the piston/cylinder arrangement 26 with brake fluid again. The exhaust muffler 31 is provided to reduce noise during venting of the pneumatic chamber 26d.

Next the 3 position/3-way solenoid 21 is switched to its second actuated position 21.2 and the 2 position/3-way solenoid valve 24 is switched back to its basic position 24.0 so that the pressurized reservoir 23 is vented in order to allow the brake fluid in the expander 6 to flow back into the pressurized reservoir 23 so that the expander 6 is drained.

Figure 2:
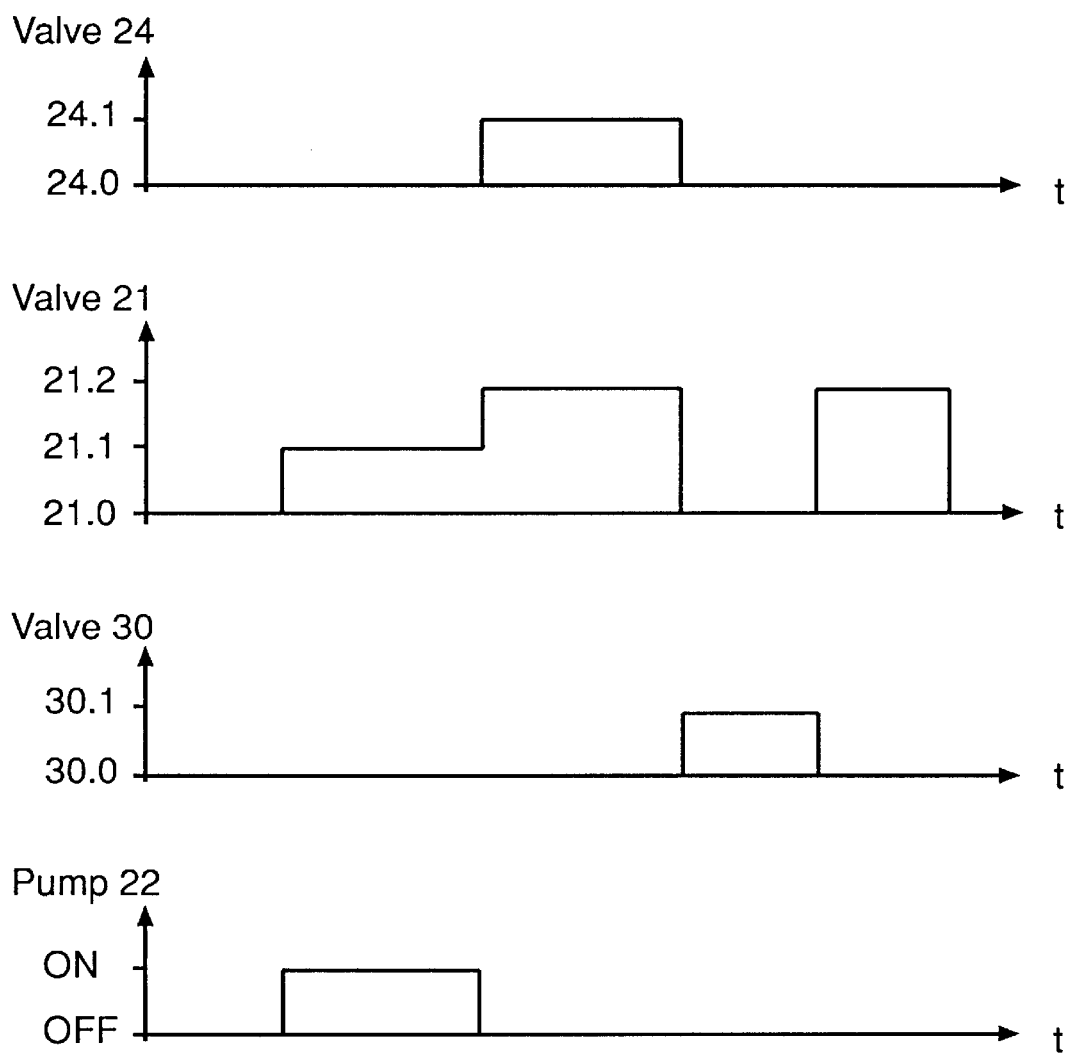
FIG. 2 is a timing diagram illustrating a method of filling a secondary circuit of a brake circuit with the prefill apparatus of FIG. 1 in accordance to this invention.

FIG. 2 illustrates a timing diagram of a method of filling the secondary circuit of a brake circuit in accordance with a preferred embodiment of the invention. From top to bottom, FIG. 2 shows the switching of the positions 24.0, 24.1 of the 2 position/3-way solenoid valve 24, the switching of the positions 21.0, 21.1. 21.2 of the 3 position/3-way solenoid valve 21, the switching of the positions 30.0. 30.1 of the second 2 positon/3-way solenoid valve 30, and the operating state of the vacuum pump 22. The method for filling the secondary circuit comprises five steps in succession as described below.

In the first step I, the 3 position/3-way solenoid valve 21 is switched to its first activated position 21.1 and the vacuum pump 22 is switched on, while the 2 position/3-way solenoid valves 24 and 30 remain in their basic positions 24.0 and 30.0, respectively, in order to evacuate air from the secondary circuit through the access port 11.

In the second step II, the 3 position/3-way solenoid valve 21 is switched to its second activated position 21.2, the 2 position/3-way solenoid valve 24 is switched to its first activated position 24.1, and the vacuum pump 22 is switched off, while the second 2 position/3-way solenoid valve 30 remains in its basic position 30.0 in order to fill the secondary circuit with brake fluid through the access port 11.

In the third step III, the 3 position/3-way solenoid valve 21 is switched back to its neutral position 21.0, the 2 positon/3-way solenoid valve 24 is switched back to its basic position 24.0, and the second 2 position/3-way solenoid valve 30 is switched to its activated position 30.1, while the vacuum pump 22 remains off, in order to expel the trapped volume of air inside the pump 7.

In the fourth step IV, the second 2 position/3-way solenoid valve 30 is switched back to its basic position 30.0 and the 3 position/3-way solenoid valve 21 is switched to its second activated position 21.2, while the 2 position/3-way solenoid valve 24 remains in its basic position 24.0 and the vacuum pump 22 is switched off in order to drain the expander 6.

In the fifth step V, the 3 position/3-way solenoid valve 21 is switched back to its neutral position 21.0, while the 2 position/3-way solenoid valves 24 and 30 remain in their basic positions 24.0 and 30.0, respectively, and the vacuum pump 22 is switched off in order to establish the initial state again.

Figure 3:
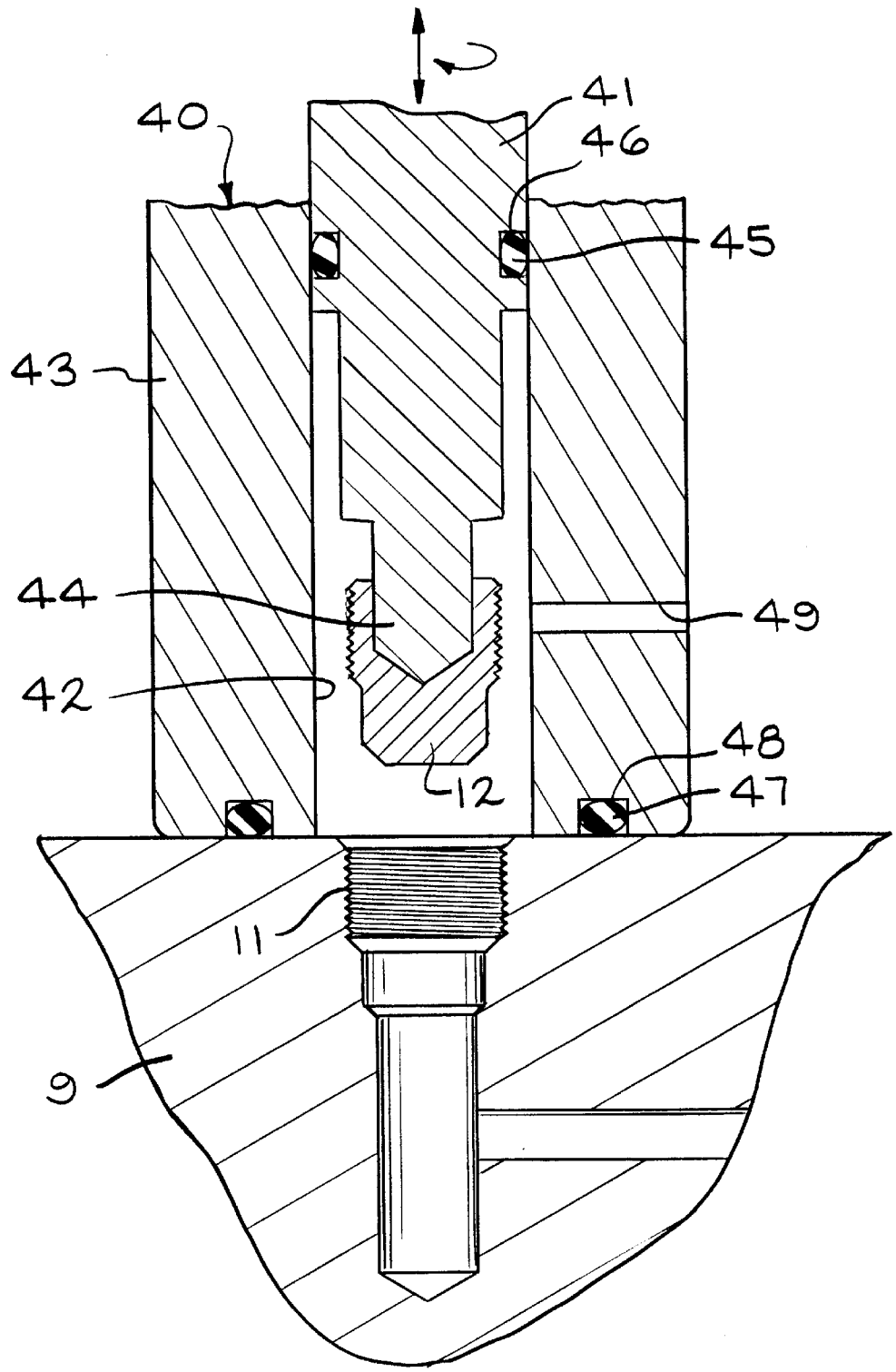
FIG. 3 is a sectional view of a connection tool positioned at an access port to a secondary circuit formed in a hydraulic control unit in accordance with this invention.

A connection tool 40 for use with the prefill apparatus 20 is illustrated in FIG. 3. The connection tool 40 includes a probe 41 slidably and rotatably mounted in a bore 42 formed in a fixture 43. Preferably, the probe 41 terminates in a tip 44 complementary to a cavity in a plug 12. An O-ring 45 is received in an annular groove 46 formed about the probe 41 to provide a fluid seal between the probe 41 and the fixture 43. An O-ring 47 is received in an annular groove 48 formed in a bottom surface of the fixture 43 to provide a fluid seal between the fixture 41 and the HCU 9. A fluid passageway 49 provides fluid communication between the bore 42 and the prefill apparatus 20 illustrated in FIG. 1.

As illustrated only in FIG. 1, the access port 11 is in fluid communication with the secondary circuit via a fluid passageway leading to the fluid passageway between valves 3a and 3b. In the embodiment illustrated in FIG. 3, the plug 12 is threaded into the access port 11. In other embodiments, a non-threaded plug can be inserted into the access port 11.

In operation, the connection tool 40 is positioned against the HCU 9 so that the bore 42 encircles the access port 11. The probe 41 is extended so that the tip 44 is received in the cavity of the plug 12 and then rotated to unthread the plug 12 from the access port 11. Next the probe 41 is retracted to remove the plug 12 from the access port 11 and provide a fluid path from passageway 49 to the secondary circuit through the access port 11. As described above, prefill apparatus 20 is used to evacuate and fill the secondary circuit and to expel any trapped air inside the pump 7. When the operations are completed, the probe 41 is extended and rotated to replace the plug 12. The installed plug 12 can subsequently be leak tested by the application of pressurized gas through port 49 in the connection tool 40 by a known method of isolating the pressure source and recording pressure decay. When installation and testing operations are completed, the connection tool 40 is removed. If desired, the connection tool 40 can be integrated with the prefill apparatus 20.

At the time when the HCU 9 is assembled, the plug 12 can be inserted into the access port 11 prior to the prefill operation described above. At this point, a conventional leak test can be performed. Later, the prefill operation described above, involving removal of the plug 12 and use of the prefill apparatus 20 can be completed. The HCU 9 with a prefilled secondary circuit can be easily and quickly installed during vehicle assembly.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for evacuating and filling a secondary circuit in a hydraulic control unit of a hydraulic braking system of a vehicle, the hydraulic control unit including at least one pressure control valve, the method comprising the steps of:
    (a) providing the pressure control valve in a bore of the hydraulic control unit;
    (b) providing an access port formed as an opening in the hydraulic control unit in fluid communication with the secondary circuit, the access port formed separately from the bore receiving the pressure control valve;
    (c) placing an apparatus in fluid communication with the secondary circuit via the access port;
    (d) evacuating trapped air from the secondary circuit through the access port by operation of the apparatus; and
    (e) filling the secondary circuit with brake fluid through the access port by operation of the apparatus.

2. The method defined in claim 1 wherein the secondary circuit includes the portion of the hydraulic system between a normally closed pressure control valve and a pump, including the step of:
    (f) expelling trapped air in the pump of the secondary circuit through the access port by operation of the apparatus.

3. The method defined in claim 2 wherein the secondary circuit includes an expander, the method including the step of:
    (g) draining hydraulic fluid from the expander of the secondary circuit through the access port by operation of the apparatus.

4. The method defined in claim 1 wherein prior to step (b), the method includes the step of providing an apparatus having a pump, a brake fluid reservoir, and a piston/cylinder arrangement, so that (1) the pump of the apparatus operated to evacuate trapped air from the secondary circuit through the access port, (2) fluid from the reservoir of the apparatus fills the secondary circuit through the access port, (3) air in the pump of the secondary circuit is expelled through the access port by actuating the piston/cylinder arrangement, and (4) fluid from the expander is drained through the access port into the reservoir of the apparatus.

5. A method of evacuating and filling a hydraulic control unit of a vehicular braking system, the method comprising the steps of:
    (a) forming a secondary circuit in the hydraulic control unit between normally closed components;
    (b) forming an access port in the hydraulic control unit in fluid communication with the secondary circuit;
    (c) placing an apparatus in fluid communication with the secondary circuit via the access port;
    (d) evacuating trapped air from the secondary circuit through the access port by operation of the apparatus; and
    (e) fining the secondary circuit with brake fluid through the access port by operation of the apparatus.

6. The method defined in claim 5 wherein the secondary circuit includes a pump and the method includes the step of (f) expelling trapped air in the pump of the secondary circuit through the access port by operation of the apparatus.

7. The method defined in claim 5 wherein prior to step (b), the method includes the step of providing an apparatus having a pump, a brake fluid reservoir, and a piston/cylinder arrangement, so that air in the pump of the secondary circuit is expelled through the access port by actuating the piston/cylinder arrangement.

8. The method defined in claim 5 wherein the secondary circuit includes an expander, the method including the step of:
    (f) draining hydraulic fluid from the expander of the secondary circuit through the access port by operation of the apparatus.

9. The method defined in claim 8 wherein prior to step (b), the method includes the step of providing an apparatus having a pump, a brake fluid reservoir, and a piston/cylinder arrangement, so that fluid from the expander is drained through the access port into the reservoir of the apparatus.

10. The method defined in claim 5 wherein prior to step (b), the method includes the step of providing an apparatus having a pump, a brake fluid reservoir, and a piston/cylinder arrangement, so that (1) the pump of the apparatus is operated to evacuate trapped air from the secondary circuit through the access port, and (2) fluid from the reservoir of the apparatus fills the secondary circuit through the access port.

11. A method of expelling air from a pump mounted in a hydraulic control unit of a vehicular braking system, the method comprising the steps of:
    (a) forming a secondary circuit in the hydraulic control unit between normally closed components;
    (b) forming an access port in the hydraulic control unit in fluid communication with the secondary circuit;
    (c) placing an apparatus in fluid communication with the secondary circuit via the access port; and
    (d) expelling trapped air from the pump through the access port by operation of the apparatus.

12. The method specified in claim 11 wherein air is expelled from the pump as fluid is forced through the access port into the secondary circuit.

13. The method specified in claim 11 wherein prior to step (d), the method includes the step of filling the secondary circuit with brake fluid through the access port by operation of the apparatus.

14. The method defined in claim 13 wherein prior to the step (d), the method includes the step of evacuating trapped air from the secondary circuit through the access port by operation of the apparatus.

* * * * *